Oct. 18, 1938.  T. J. SMULSKI  2,133,724
KITCHEN UTENSIL
Filed Jan. 17, 1936  2 Sheets-Sheet 1
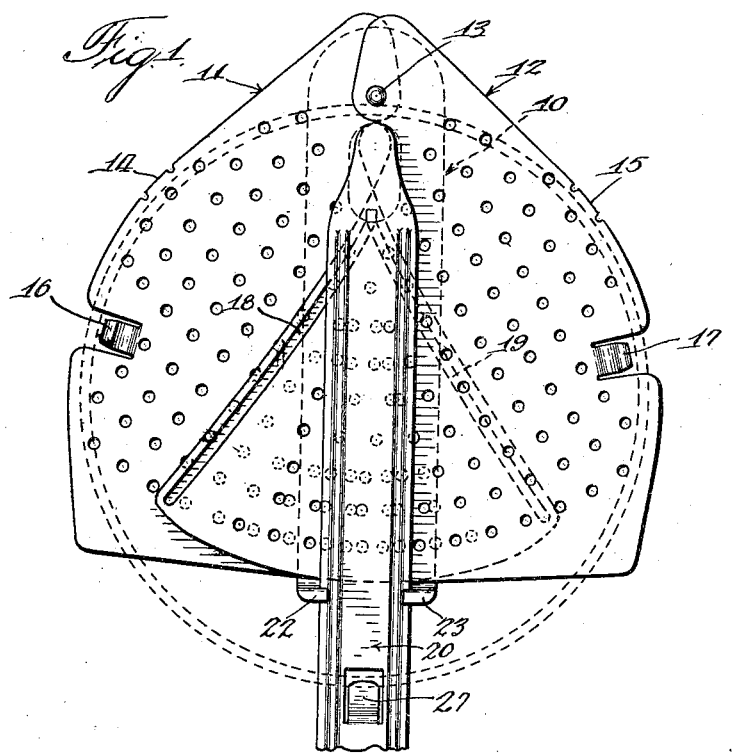
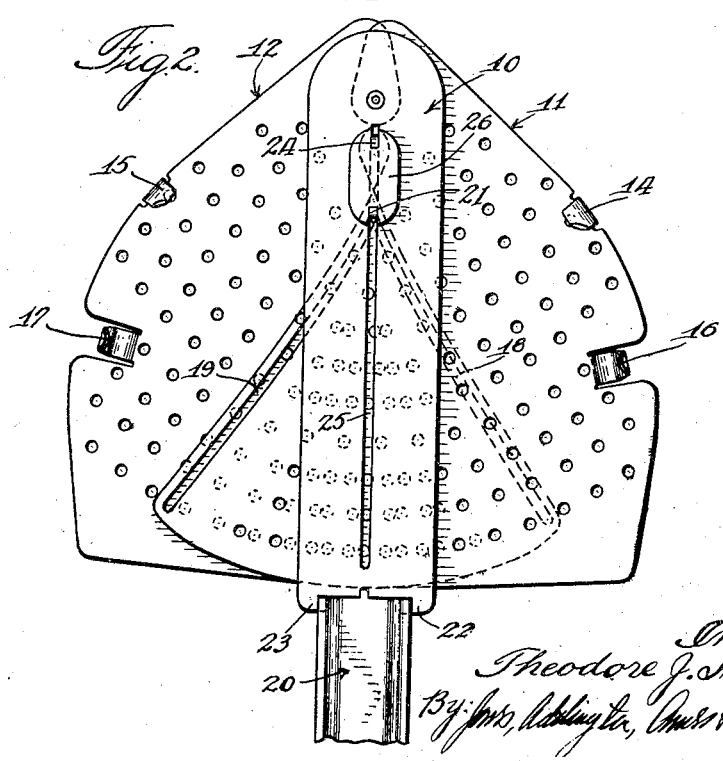
Inventor
Theodore J. Smulski

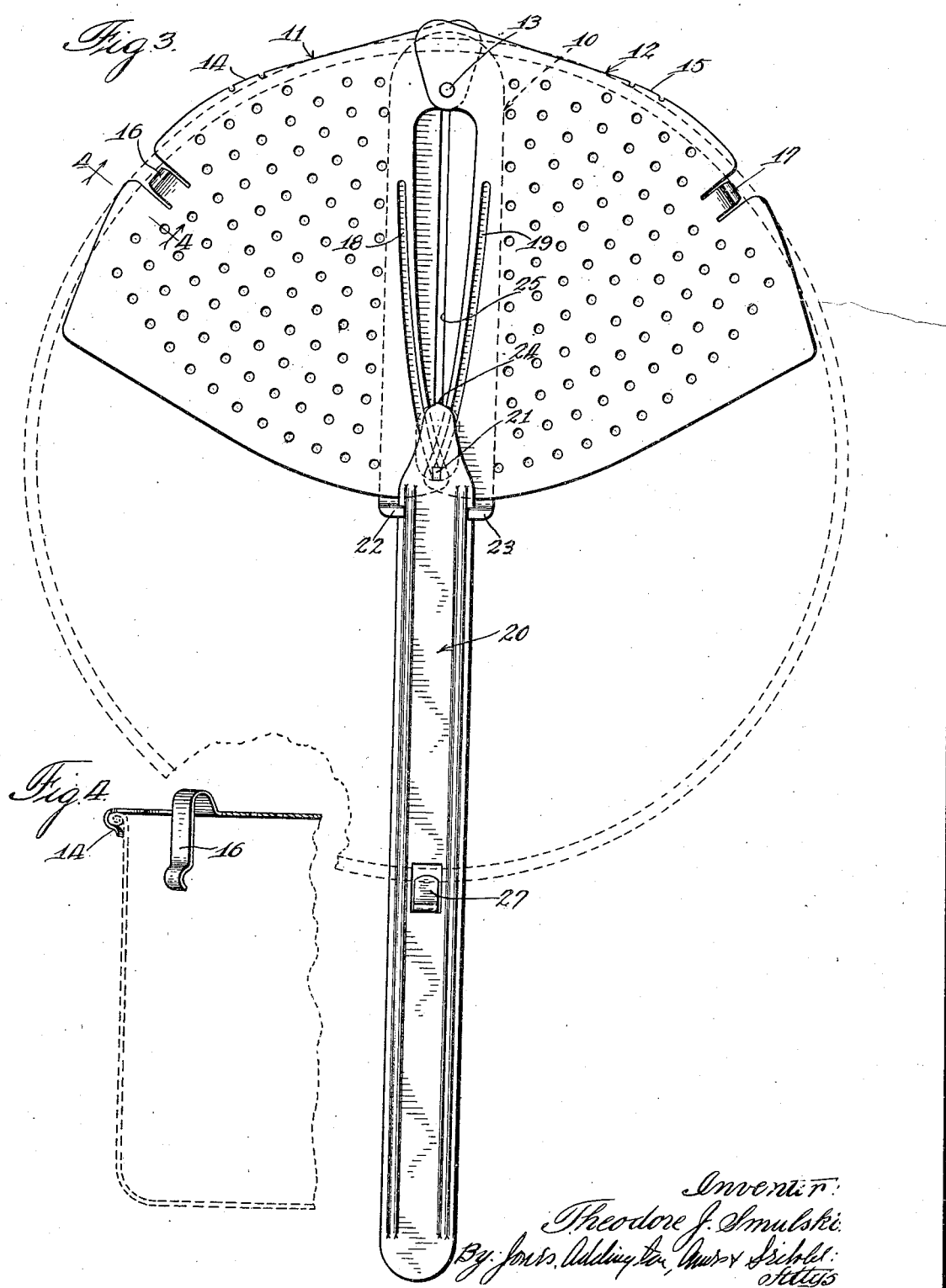

Patented Oct. 18, 1938

2,133,724

UNITED STATES PATENT OFFICE 2,133,724

KITCHEN UTENSIL

Theodore J. Smulski, Knox, Ind.

Application January 17, 1936, Serial No. 59,540

6 Claims. (Cl. 210—155)

This invention relates to a kitchen utensil and has special reference to a drainer which may be adjustably and detachably clamped in position on various sized pots, pans, kettles, and the like, to drain liquids or semi-liquids from solids held therein.

More particularly, this invention has reference to a drainer for open-ended vessels comprising a plurality of foraminous strainer elements cooperatively engaged for covering at least one side of the open end of the vessel having clamping means fixed thereon and means extending therefrom for movement to clampingly engage the edge of the other side of the vessel, the movement into position of the extending means automatically adjusting the strainer elements so that the clamping means thereof clampingly engage the edge of the vessel adjacent thereto.

The drainer of the present construction contemplates the adjustment thereof to fit automatically upon attachment the various kitchen utensils to which it may be adapted in a simple and expeditious manner. It is constructed in a manner such that the cooperating plurality of strainer elements overlap along adjacent edges, there being a plurality of guideways on the strainer elements for receiving means extending from the handle at registering portions thereof whereby movement of the handle to clampingly engage an opposite side of the kettle moves the strainer elements into such position that the clamping means thereof clampingly engage the adjacent edge of the vessel. Such automatic adjustment to fit the open ends of the kettles, pots, pans, and the like, obviates the necessity for separate manual adjustment at the engaging portions, which latter, if not very carefully accomplished, may result in the scalding or burning of the attendant from steam given off from the liquid or the liquid itself in the vessel.

It is therefore one of the objects of this invention to provide an adjustable drainer of the type above described in which the clamping engagement to fit various sized vessels may be automatically accomplished in a simple movement of the handle member extending preferably substantially beyond the confines of the kettle.

It is also an object of this invention to provide a construction of the character above noted which is comparatively inexpensive, durable and simple in operation.

Other objects and advantages will hereinafter be more particularly pointed out and for a more complete understanding of the characteristic features of this invention, reference may now be had to the following description when taken together with the accompanying drawings, in which latter:

Figure 1 is a top plan view of the construction embodying the features of this invention, the drainer being shown as adapted for use on a kettle of comparatively small diameter;

Fig. 2 is an underneath view of the construction shown in Fig. 1;

Fig. 3 is a view similar to Fig. 1 showing an extended condition of the construction and its relation with a pan of substantially greater diameter; and Fig. 4 is a fragmental sectional view taken on the line 4—4 of Fig. 3 showing the relation of the clamping means of the foraminous strainer elements with a vessel.

Referring now more particularly to the drawings, the device of this invention comprises essentially an elongated plate member 10 having a pair of foraminous strainer elements 11 and 12 preferably pivotally mounted at one end thereof. It is, of course, understood that this invention is not to be limited to a pair of foraminous strainer elements but that any suitable number thereof may be employed without departing from the teachings of this invention. The plate 10 is preferably formed of sheet metal such as stainless steel as are the foraminous strainer elements 11 and 12.

The strainer elements 11 and 12 are preferably of substantially the form of a sector in which the substantially arcuate portions thereof are adapted to be disposed about the periphery of the vessel. Adjacent edges of the strainer elements overlap on the plate, and in the embodiment shown in the drawings, a rivet 13 passing through registering apertures in the plate 10 and strainer elements 11 and 12 acts as the pivotal point for the movement of the strainer elements for adjustment to the size for fitting vessels of various diameters.

The strainer elements 11 and 12 are provided with clamping means for engaging the edge of one side of the vessel, the clamping means preferably comprising depending fingers 14 and 15 for engaging the outside edge of the kettle as shown more particularly in Fig. 4, the edge being provided with a bead and the depending fingers preferably conforming substantially in shape thereto. The fingers 14 and 15 being on separate strainer elements are thereby spaced and preferably a substantial distance in order to provide a definite clamping action about the periphery of the vessel. It is also preferable to provide cooperating clamping means on the strainer elements for engagement with the inside edge of the vessel, these clamping means being shown in the form of spring fingers 16 and 17. Resilient clamping means assist in holding the fingers 14 and 15 in a confining engagement with the usual beads on the peripheries of open-ended vessels.

In order to move the strainer elements into their adjustable positions with respect to each other, each strainer element is provided with a guideway which, as shown in the drawings, is in the nature of slots 18 and 19 preferably extending along the adjacent edges of the elements. These guideways or slots 18 and 19 are so disposed relative to each other that they register over portions thereof as the strainer elements are pivoted in a direction toward each other or away from each other. In order, therefore, to operate the strainer elements in this just described manner, means are provided on the handle 20 for engaging the registering portions of the slots 18 and 19, the particular means preferably comprising a depending finger 21 which is slit and deformed from the material of the handle and the finger being of a size to slidably engage the slots 18 and 19. A movement of the finger 21 along the slots 18 and 19 will, of course, pivot the foraminous members in a direction toward or away from each other depending upon the direction of movement of the finger.

In order to direct the movement of the handle member 20 in a specific path of travel, a pair of ears 22 and 23 are preferably struck from the material of the plate to overlap the longitudinally extending edges of the handle to prevent displacement therefrom in one direction, the plate proper preventing displacement in the other direction. Co-operating therewith in directing the movement of the handle 20 is a second finger 24 disposed a spaced distance from the depending finger 21 and preferably formed in the same manner by deforming an integral portion of the handle of the size to engage a slot 25 in the plate 10. In this connection, it may also be desirable for commercial expediency to extend the depending finger 21 through the slot 25 in the same manner as that of finger 24, whereafter both of these fingers may be clinched over a washer member 26 on the side of the plate opposite to the handle engaging portion in order that a free sliding movement may be had to obviate binding.

The handle 20 is provided with a clamping means preferably in the form of a finger 27, this finger being formed by cutting and deforming the material of the handle into such shape as to engage the under surface of the usual bead on the kettle. The handle element extends beyond the other side of the vessel to which the foraminous strainer elements are attached so that all of the clamping elements are spaced about the open end of the vessel.

In the operation of the drainer, the attendant grasps the handle element 20 at the free end thereof and positions the foraminous strainer elements over the top of the vessel, the hand of the operator and everything about his person being not in the line of the steam given off from the hot liquid of the solids in the vessel. The clamping elements 14 and 15 are hooked over the beaded edge of the vessel, the handle being disposed at an angle to the plane of the top of the kettle. The handle is thereafter pulled outwardly against the resistance of the clips 14 and 15 to a position such that the depending spring fingers 16 and 17 may be inserted on the inside of the kettle and brought against the side edges thereof by a movement downwardly of the handle into substantially the plane of the top of the kettle. The handle is thereafter moved inwardly toward the strainer elements and such movement pivots the strainer elements into clamping position as the clamping member 27 engages the bead of the kettle on the opposed side. The drainer is now in condition for draining the liquid or semi-liquid from the solids in the vessel, the solids, of course, being withheld by the foraminous strainer elements and the liquid or semi-liquid being permitted to drain therethrough.

While but a single embodiment of this invention is herein shown and described, it is to be understood that various modifications thereof may be apparent to those skilled in the art without departing from the spirit and scope of this invention and, therefore, the same is only to be limited by the scope of the prior art and the appended claims.

I claim:

1. A drainer for open-ended vessels such as pans, pots, kettles and the like comprising a plurality of foraminous strainer elements for covering at least one side of the open end of said vessels, a plate on which said strainer elements are pivotally mounted, clamping means fixed on said strainer elements, said strainer elements having guideways thereon, a substantially rigid handle, means on said handle for movably engaging said guideways for the pivotal movement of said strainer elements on said plate, said handle extending beyond the other side of said vessel, and means on said handle for movement therewith to clampingly engage the edge of the adjacent side of the vessel, the movement of said handle pivoting said strainer elements on said plate into such adjustment that the clamping means thereof clampingly engage the adjacent edge of the vessel.

2. A drainer for open-ended vessels such as pans, pots, kettles and the like comprising a plurality of foraminous strainer elements for covering at least one side of the open end of said vessels, a plate on which said strainer elements are pivotally mounted, clamping means fixed on said strainer elements, each of said strainer elements having a guideway thereon, a substantially rigid handle, means on said handle common to each of said guideways for movement therealong to pivot said strainer elements on said plate, said handle extending beyond the other side of said vessel, and means on said handle for movement therewith to clampingly engage the edge of the adjacent side of the vessel, the movement of said handle pivoting said strainer elements into such adjustment that the clamping means thereof clampingly engage the adjacent edge of the vessel.

3. A drainer for open-ended vessels such as pans, pots, kettles and the like comprising a plurality of foraminous strainer elements for covering at least one side of the open end of said vessels, a plate on which said strainer elements are pivotally mounted, clamping means fixed on said strainer elements, each of said strainer elements and said plate having a guideway thereon, a substantially rigid handle, means on said handle engaging in common all of said guideways for movement therealong to pivot said strainer elements on said plate, said handle extending beyond the other side of said vessel, and means on said handle for movement therewith to clampingly engage the edge of the adjacent side of the vessel, the movement of said handle pivoting said strainer elements into such adjustment that the clamping means thereof clampingly engage the adjacent edge of the vessel.

4. A drainer for open-ended vessels such as pans, pots, kettles and the like comprising a plurality of foraminous strainer elements for covering at least one side of the open end of said vessels, a plate on which said strainer elements are pivotally mounted, clamping means fixed on said strainer elements, said strainer elements overlapping along adjacent edges and each of said elements having a groove, a substantially rigid handle, means extending from said handle engaging registering portions of said grooves whereby movement of said handle pivotally operates said strainer elements on said plate, said handle extending beyond the other side of said vessel, and means on said handle for movement therewith to clampingly engage the edge of the adjacent side of the vessel, the movement of said handle pivoting said strainer elements on said plate into such adjustment that the clamping means thereof clampingly engage the adjacent edge of the vessel.

5. A drainer for open-ended vessels such as pans, pots, kettles and the like comprising a plurality of foraminous strainer elements for covering at least one side of the open end of said vessels, a plate on which said strainer elements are pivotally mounted, clamping means fixed on said strainer elements, said strainer elements overlapping along adjacent edges and each of said elements having a groove, a substantially rigid handle, means extending from said handle engaging registering portions of said grooves whereby movement of said handle pivotally operates said strainer elements on said plate, said handle slidably engaging said plate and extending beyond the other side of said vessel, and means on said handle for movement therewith to clampingly engage the edge of the adjacent side of the vessel, the movement of said handle pivoting said strainer elements on said plate into such adjustment that the clamping means thereof clampingly engage the adjacent edge of the vessel.

6. A drainer for open-ended vessels such as pans, pots, kettles and the like comprising a plurality of foraminous strainer elements for covering at least one side of the open end of said vessels, a plate on which said strainer elements are pivotally mounted, clamping means fixed on said strainer elements, said strainer elements overlapping along adjacent edges on said plate and said strainer elements and plate having grooves, a substantially rigid handle, means extending from said handle engaging registering portions of said grooves on said strainer elements and said plate whereby movement of said handle pivotally operates said strainer elements on said plate, means on said plate for slidably receiving said handle in confining engagement, said handle extending beyond the other side of said vessel, and means on said handle for movement therewith to clampingly engage the edge of the adjacent side of the vessel, the movement of said handle pivoting said strainer elements on said plate into such adjustment that the clamping means thereof clampingly engage the adjacent edge of the vessel.

THEODORE J. SMULSKI.